United States Patent [19]
Sourgen

[11] Patent Number: 5,264,742
[45] Date of Patent: * Nov. 23, 1993

[54] SECURITY LOCKS FOR INTEGRATED CIRCUIT

[75] Inventor: Laurent Sourgen, Aix en Provence, France

[73] Assignee: SGS-Thomson Microelectronics, S.A., Gentilly, France

[*] Notice: The portion of the term of this patent subsequent to Mar. 31, 2009 has been disclaimed.

[21] Appl. No.: 857,959

[22] Filed: Mar. 26, 1992

Related U.S. Application Data

[63] Continuation of Ser. No. 638,459, Jan. 8, 1991, Pat. No. 5,101,121.

[30] Foreign Application Priority Data

Jan. 9, 1990 [FR] France .............................. 90 00168

[51] Int. Cl.⁵ ................................. H03K 19/003
[52] U.S. Cl. .................................... 307/465; 307/443
[58] Field of Search ................... 307/202.1, 465, 468, 307/443, 471, 272.2; 235/382, 382.5; 340/825.31, 825.34

[56] References Cited

U.S. PATENT DOCUMENTS

| | | | |
|---|---|---|---|
| 4,209,282 | 6/1980 | Dinath et al. | 235/382.5 |
| 4,409,943 | 10/1983 | Basset et al. | 307/468 X |
| 4,439,967 | 3/1984 | Basset et al. | 235/382.5 X |
| 4,583,011 | 4/1986 | Pechan | 307/468 X |
| 4,703,163 | 10/1987 | Genest | 235/382 |
| 4,783,606 | 11/1988 | Goeffing | 307/465 |
| 4,855,670 | 8/1989 | Green | 371/25 X |
| 4,916,333 | 4/1990 | Kawalski | 340/825.31 X |
| 4,932,053 | 6/1990 | Fruhauf et al. | 380/4 |
| 5,010,331 | 4/1991 | Dias et al. | 340/825.34 X |

Primary Examiner—David R. Hudspeth

[57] ABSTRACT

In order to modify the configuration of an integrated circuit, for example to restrict access by the user to certain functions or certain pieces of data of the circuit, the integrated circuit is provided with a first electronic lock capable of being locked or unlocked during a stage for the testing of the integrated circuit and capable of being irreversibly locked after the end of the testing stage, and a second electronic lock capable of being unlocked only so long as the first lock is unlocked. In this way, the entire circuit can be tested in the form in which it is presented to the user, the locking of the locks being, so to speak, simulated during the test.

21 Claims, 1 Drawing Sheet

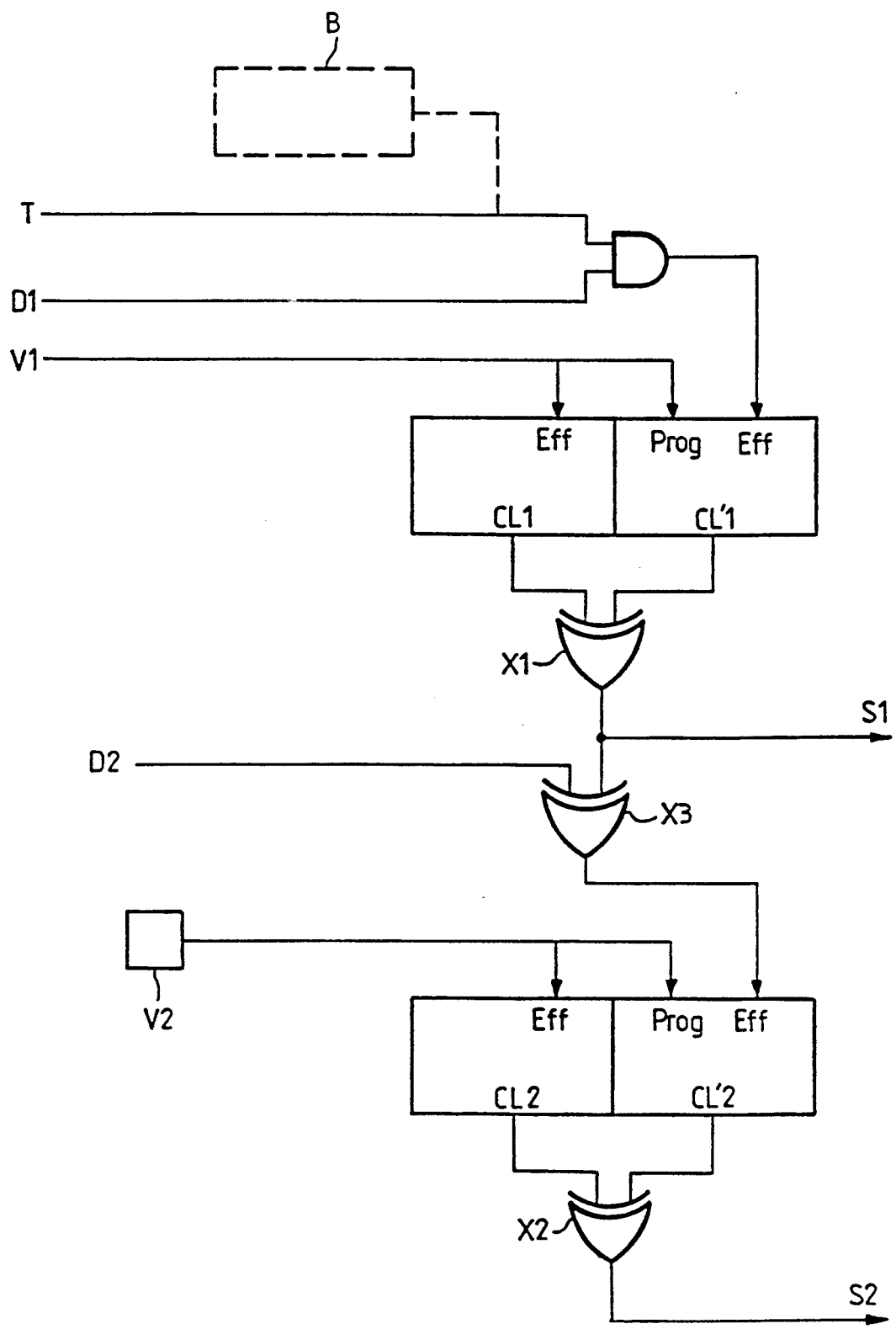

SECURITY LOCKS FOR INTEGRATED CIRCUIT

RELATED APPLICATION

This is a continuation of U.S. patent application Ser. No. 07/638,459, filed Jan. 8, 1991, issued as U.S. Pat. No. 5,101,121 on Mar. 31, 1992.

BACKGROUND OF THE INVENTION

1. Field of the Invention

The invention concerns integrated circuits. It can be applied particularly, but not exclusively, to integrated circuits for memory cards and especially to circuits wherein the essential element is a electrically erasable programmable memory requiring electronic security mechanisms.

2. Description of the Prior Art

Security is needed in a great many applications where it is sought to make the information stored in a memory incapable of being read or incapable of being modified by the user of the card. This is the case, for example, with bank cards or in other applications where the integrated circuit is used to perform transactions or operations of a financial nature. This is also the case with access control operations or operations for checking the identity of a user etc.

In other applications, a security system may be necessary to modify or prohibit certain functions of the circuit, depending on the user.

For convenience's sake, the explanation of the present invention is given with reference to an application of an integrated circuit for a memory card requiring security mechanisms that give protection against access to certain zones or certain functions of the circuit.

In practice, the integrated circuit is first marketed by a manufacturer of integrated circuits. The card is then marketed by a party who shall be called the "issuing party" and the card is used by an ultimate "user". The term "issuing party" is used herein in the context of applications such as banking applications where the bank "issues" chip cards having a monetary value. However, the term "issuing party" should not be restricted to applications of this type, and it shall hereinafter designate any person or organization or firm that installs a security mechanism after having configured certain functions or items of data of the card and before giving the card to the ultimate user. The issuing party will have access to certain functions of the circuit and the ultimate user will have access to other functions (as a rule, he will have access to more restricted functions).

The following operations are necessary before the card is given to the ultimate user: the manufacture of the integrated circuit, the testing of the integrated circuit, the supply of the tested circuit to the issuing party, the fitting of the integrated circuit into the card by the issuing party or by the issuing party's supplier, the introduction of data or the setting up of a particular configuration of the integrated circuit (customizing for example) by the issuing party in accordance with the needs of the ultimate user, the activation by the issuing party of a security mechanism (present in the integrated circuit) that bars access by the ultimate user to certain zones of the circuit, notably certain memory zones.

For the integrated circuit manufacturer, the problem takes the following form: all the functions and pieces of data of the integrated circuit have to be tested, for the manufacturer cannot deliver defective circuits to his customer, namely the "issuing party". The manufacturer therefore performs tests, notably on all the memory zones and on the various functions of the circuit.

The invention is based on the observation that the tests carried out up till now are incomplete for they do not enable the manufacturer to check the functioning of the circuit in the exact configuration in which it is seen by the user, i.e. after the processing operations performed by the issuing party (the setting up of various configurations, the introduction of data and the activation of a protection lock).

This difficulty also exists when, in certain applications, the manufacturer himself sets up a security mechanism which he activates after the tests on the circuit, before delivering this circuit to the issuing party. For, in practice, the manufacturer cannot test the circuit in the exact configuration in which it is received by the issuing party, i.e. a configuration in which the security mechanism is activated.

The difficulties get added to one another when the manufacturer and the issuing party activate a security mechanism each.

The security mechanisms are irreversible logic locks which change the functions of the circuit when they are activated: for example, they bar access to certain parts of the integrated circuit.

SUMMARY OF THE INVENTION

The invention proposes an integrated circuit having different electronic functions, among them certain functions that can be modified irreversibly by the activation of a first electronic lock capable of being locked or unlocked during a stage for the testing of the integrated circuit and capable of being irreversibly locked after the end of the testing stage, and of second a electronic lock capable of being unlocked only so long as the first lock is unlocked.

Through this set of two locks which are temporarily capable of being unlocked and then permanently locked and incapable of being unlocked, it is possible to carry out far more intensive testing operations. These testing operations make it possible, in particular, to test the reduced or modified functions of the circuit, such as they are available to the ultimate user. This was not possible in the prior art. For, in the prior art, it was possible to test only the overall functions of the circuit, without it being possible to test the reduced functions such as they exist after locking. As understood in the present invention, when we speak of the modification of certain functions by means of an electronic lock, we include the modification of functions as such, the modifications of the configuration of the circuit, the modifications of recorded data, the modifications of access to memory zones, in reading and in writing mode, etc., without any particular restriction. In a particularly advantageous embodiment, a set of two electrically erasable and programmable memory cells will be used as a lock (first lock and/or second lock), the first cell being provided with a programming or erasure command, and the second cell being provided with a programming command and also an erasure command, with an exclusive-OR gate having each of its inputs connected to a respective cell. For the first lock, it is provided that one of the commands of the second cell of this lock can be activated only during the testing stage. It is inaccessible after the end of the testing stage.

For the second lock, it is provided that one of the commands of the second cell of this lock is inhibited by the output of the first lock when this first lock is locked.

Quite advantageously, it is provided that the command for locking a lock is applied by a command for the erasure of one of the cells and by a command for the programming of the other cell. The unlocking command is then applied (when possible) by a reverse command for the cell having both a programming command and an erasure command available to it.

The electronic locking system proposed herein enables the performance of testing operations which, according to the invention, can take place in the following sequence:
- a general test is carried out on the integrated circuit while a first electronic lock is in an initial unlocked state;
- the first lock is locked, and the functions modified by this locking are tested;
- a second lock is locked, and the functions modified by this second locking are tested;
- the first lock is unlocked;
- the second lock is unlocked, this unlocking being made possible by the fact that the first lock is unlocked;
- the first lock is locked irreversibly and, subsequently to this locking, any future unlocking of the second lock, after it has been activated, is barred.

This test can be conducted on the integrated circuit manufacturer's premises. It enables the circuit to be tested while the functions are modified by a sort of simulation of the locking of the two locks. A check is therefore made on the functions modified not only by the first lock (the lock which, in principle, is activated by the manufacturer after the test and before the circuit is supplied to the "issuing party"), but also by the second lock (the lock activated by the issuing party before the circuit is supplied to the user). Then, the initial state (with the locks unlocked) is returned to and finally the first locking is done alone, and this is done irreversibly.

To enable the unlocking of the first lock throughout the testing stage, it is preferably provided that the integrated circuit will remain supplied with voltage throughout this testing stage and that the unlocking command may be inhibited by a one-shot latch type of flip-flop circuit. Such a latch can change its state once at the first occasion when it is turned on. When the current is cut off, it flips back into a state which it can no longer leave during subsequent occasions when it is turned on. The unlocking command will then no longer be usable.

BRIEF DESCRIPTION OF THE DRAWING

Other features and advantages of the invention shall appear from the following detailed description, which is made with reference to the appended drawing wherein the single figure represents a diagram of the system of electronic locks incorporated into an integrated circuit according to the invention.

DESCRIPTION OF A PREFERED EMBODIMENT

The integrated circuit according to the invention is designed to fulfil different electronic functions which may be any functions (storage of data, processing of logic or analog signals, etc.). These functions are not important: what is important is that they can be modified by electronic locks.

The modification may relate, for example, to a restriction of access to certain zones of a memory. It may also relate, for example, to a restriction of access to certain functions: for example, permission for reading only and prohibition of writing in certain memory zones.

A first lock is shown in the circuit of the drawing. When the locking is activated, this first lock gives a signal S1 for modifying the functions of the integrated circuit. In other words, before locking, the signal S1 may be, for example, at a low logic level (with the lock non-activated) while, after locking, the signal S1 could be at a high logic level. The signal S1 controls a modification of functions of the integrated circuit, chiefly a modification of the access functions.

A second lock gives a signal S2 when it is activated. The signal S2 controls other functional modifications.

The first lock is designed to be activated by the manufacturer of the integrated circuit in order to obtain irreversible locking after the end of the tests and before this circuit is supplied to a customer. The customer is understood herein to be the party who issues cards intended for users.

The second lock is designed to be activated by the customer, namely the "issuing party", for example after the circuit has been configured in a particular way (through the recording of data) and before it is supplied to the ultimate user. Since the second lock is designed to be activated by the issuing party, an input pad of the integrated circuit is provided in the diagram of the drawing. Through this input pad, the issuing party can apply a locking command signal V2.

On the contrary, since the first lock is designed to be activated by the manufacturer during testing operations in the factory, a locking signal V1 and an unlocking signal D1 for the first lock are not necessarily transmitted through input/output terminals of the integrated circuit. They may be signals internal to the integrated circuit or signals coming from test pads on the edge, which are not connected to the output terminals. Similarly, for the unlocking, the second lock may be deactivated by an unlocking signal D2 which is not necessarily transmitted by an external terminal of the integrated circuit since it does not have to be produced either by the issuing party or by the ultimate user.

In the drawing, the locking signal V1 and unlocking signals D1 and D2 are not shown as being linked to input/output terminals of the integrated circuit. However, this does not exclude the possibility of their being so linked.

The first lock preferably has two electrically erasable and programmable memory cells CL1 and CL'1, which are as identical as possible and preferably physically juxtaposed in the circuit so as to have characteristics that are as identical as possible. It also includes an exclusive-OR gate X1, the two inputs of which are each connected to a respective cell.

The reading and writing circuits of the two cells are not shown. The signal S1 indicating whether the lock is locked or not is taken at the output of the gate X1 in the reading mode of the cells. The locking and unlocking are done in writing mode.

In the example described, the lock is considered to be unlocked (S1=0) when the two cells CL1 and CL'1 are in an identical state. It is considered to be locked (S1=1) when the cells are in complementary states (one programmed and the other erased). This results from the presence of the exclusive-OR gate at output of the cells.

One of the cells, for example CL1, has only an erasing command (this could be only a programming command but, in the example described, it will be considered to be an erasing command). The other cell CL'1 has both an erasing command and a programming command.

The locking command is carried out in a dual operation wherein the first cell CL1 is erased and the second cell CL'1 is programmed. In the drawing, this dual operation is symbolized by a single electrical connection applying a locking signal V1 both to the erasure input of CL1 and to the programming input of CL'1. In fact, it is necessary to take in account the fact that the erasing or programming operations are more complex than the simple application of a logic signal V1. These are highly standard operations for the memories, and shall not be described. The programming and the erasure may be simultaneous or may immediately succeed one another.

The unlocking command is carried out, when possible, by the erasure of the second cell CL'1. But if the first cell CL1 should have only one programming command, the unlocking command would take place by the programming of the second cell.

The second lock may be constituted exactly in the same way as the first one, with a first cell CL2 having only an erasure command and a second cell CL'2 having both an erasure command and a programming command. An exclusive-OR gate X2 receives the output of the first cell and the output of the second cell at its two inputs respectively. In the reading mode of the cells, the signal S2, indicating whether the second lock is activated or not, is picked up at the output of the gate X2. The locking command is carried out by the signal V2 which erases the first cell CL2 and programs the second cell CL'2. The unlocking command is carried (when possible) by the erasure of the second cell.

Finally, as can be seen in the drawing, means are provided so that the second lock unlocking signal D2 can be applied to the erasure input of the cell CL'2 only when the first lock is unlocked (S1=0). This prohibition is represented symbolically by an exclusive-OR gate X3 receiving the signal D2 and the output S1. Furthermore, means are also provided to enable the first lock unlocking signal D1 to be applied to the erasure input of the second cell CL'1 only during the stage for testing the integrated circuit (the manufacturer's test), any unlocking being subsequently impossible (for the customer and for the ultimate user). In the drawing, this function is symbolized by an AND gate receiving the signal D1 and letting it through under the control of a signal T present during the test and not after the test, or again under the control of a one-shot latch B (shown in dashes in the drawing). During the test, this latch goes into a state that permits the unlocking. When the supply to the integrated circuit is stopped after the end of the test, it goes into another state which prohibits the unlocking, and its characteristic feature is that it can no longer go into the first state when it is turned on again.

The general working of the circuit and the method of the invention are as follows:

When the circuit has been manufactured, the electrically programmable memory cells constituting the locks are in a state that is, in principle, "erased". In principle, they are constituted by floating-gate transistors which normally have their floating gates devoid of electrical charges. However, it is not absolutely certain that this is so. At any rate it is most probable that the cells are all charged in the same way even if they are not clearly in the erased state. This is why each lock has two identical cells, the unlocked state being any initial state (in principle erased but not necessarily so) for which the cells give a same output signal and for which, consequently, the exclusive-OR gate X1 or X2 gives a zero logic level.

The final test after manufacture is conducted firstly with the locks unlocked, i.e. before any activation of the locking commands V1 and V2.

Then, the command V1 is used to lock the first lock. From this point onwards, it is provided that the supply current to the integrated circuit is no longer cut off until the end of the test. This will be so at least when it is the one-shot latch B that is used to prohibit the unlocking after the end of the test. For, the action of turning the current off will put the latch into a state which it can no longer leave even if it is turned on again, and this state is the one that commands the inhibition of the unlocking command D1.

The locking by the command VI consists in the application, as has been stated, in the reading mode and not the writing mode of the cells CL1 and CL'1 of the signals for erasing the cell CL1 (even if it were already erased) and for programming the cell CL'1. The passing of the two cells into complementary states makes the output S1 of the exclusive-OR gate X1 go into the high state (in reading mode).

Then the integrated circuit, with the configuration and the functions modified by the first lock, is tested.

Then, the second lock is locked by means of the signal V2: in the writing mode of the cells CL2 and CL'2, CL2 is erased and CL'2 is programmed. In reading mode, the output of the exclusive-OR gate X2 goes to the high state following the passing of the cells into complementary states. The configuration or the functions of the integrated circuit are then modified as if the customer, namely the "issuing party", had modified them.

The circuit is tested in this modified configuration.

The first lock is unlocked by the command D1 (non-inhibited by the latch B). The command acts to erase the cell CL'1, placing it therefore in the same state as the erased cell CL1. This zero-sets the signal S1 at output of the exclusive-OR gate X1. This makes it possible subsequently to unlock the second lock by means of the command D2.

The second lock is unlocked in the same way as the first one: by erasure of the cell CL'2. This zero-sets the signal S2 at the output of the gate X2.

If this is necessary for other testing operations, the locking of the first and second locks, testing operations and then the unlocking of the locks can be repeated several times.

After the end of the tests, the first lock is locked irreversibly by the action of the locking command V1 (the erasure of the cell CL1 and the programming of CL'1).

The second lock remains unlocked (two erased cells CL2, CL'2).

The supply current is cut off. The one-shot latch B, when turned on, will irreversibly assume a state that inhibits any passage of the unlocking signal D1.

The circuit is ready to be delivered to the customer who can activate the locking command V2 once and only once, for example after having conducted operations of configuration and operations for the introduction of data etc. These operations may consist, for example, of the introduction, into a memory zone, of numbers representing, for example, sums of money or, again, an identification of the user etc.

After permanent locking by the command V2, the second lock cannot be unlocked since the first lock bars any unlocking of the second one.

We have been able to test the circuit in the initial configuration, when it comes off the production line, then in the intermediate configuration as delivered to the customer, namely the issuing party, and finally in the final configuration as seen by the user.

What is claimed is:

1. An integrated circuit having different electronic functions, among them at least certain functions that can be modified irreversibly by an irreversible activation of an electronic lock, wherein said circuit includes:
   a first electronic lock capable of being locked or unlocked during a testing stage for a testing of the integrated circuit and capable of being irreversibly locked after the end of the testing stage;
   and a second electronic lock capable of being unlocked only so long as said first electronic lock is in the unlocked condition.

2. An integrated circuit according to claim 1, wherein said certain functions includes at least a first function and a second function; said first electronic lock being associated with said first function; and said second electronic lock being associated with said second function.

3. An integrated circuit according to claim 1, wherein said first electronic lock is constituted by a set of first and second electrically erasable and programmable memory cells, a first command circuit for applying a locking signal to at least one of said first and second cells, and a second command circuit for applying an unlocking signal to at least one of said first and second cells; wherein said second electronic lock is constituted by a set of third and fourth electrically erasable and programmable memory cells, a third command circuit for applying a locking signal to at least one of said third and fourth cells, and a fourth command circuit for applying an unlocking signal to at least one of said third and fourth cells.

4. An integrated circuit according to claim 3 wherein said fourth command circuit for applying an unlocking signal to at least one of said third and fourth cells is inhibited from applying an unlocking signal to said at least one of said third and fourth cells when said first electronic lock is in the locked condition.

5. An integrated circuit according to claim 1, wherein said first electronic lock is constituted by a set of first and second electrically erasable and programmable memory cells, a first command circuit for applying a locking signal to at least one of said first and second cells to cause said first and second cells to have states which differ from each other, a second command circuit for applying an unlocking signal to at least one of said first and second cells to cause said first and second cells to have the same states.

6. An integrated circuit according to claim 5, wherein said second electronic lock is constituted by a set of third and fourth electrically erasable and programmable memory cells, a third command circuit for applying a locking signal to at least one of said third and fourth cells to cause said third and fourth cells to have states which differ from each other, a fourth command circuit for applying an unlocking signal to at least one of said third and fourth cells to cause said third and fourth cells to have the same states.

7. An integrated circuit according to claim 6 further comprising a first exclusive-OR gate having each of its inputs connected to a respective one of said first and second cells.

8. An integrated circuit according to claim 7 further comprising a second exclusive-OR gate having each of its inputs connected to a respective one of said third and fourth cells.

9. An integrated circuit according to claim 8 wherein said fourth command circuit comprises a third exclusive-OR gate having one of its inputs connected to the output of said first exclusive-OR gate and the other of its inputs connected to receive an unlocking signal for said fourth command circuit, the output of said third exclusive-OR gate being connected to one of said third and fourth cells for applying an unlocking signal thereto to cause said third and fourth cells to have the same states.

10. An integrated circuit according to claim 9 wherein said second command circuit comprises an AND circuit, the output of said AND circuit being connected to said second cell, a first input of said AND circuit being connected to receive an unlocking signal for said second command circuit, a second input of said AND circuit being connected to receive a signal indicating a testing stage mode.

11. An integrated circuit according to claim 10 wherein said second input of said AND circuit is connected to a one-shot latch circuit which can change to its on state at the first occasion when it is turned on and then changes to a permanent off state when the current thereto is first turned off, to thereby permit the unlocking of said first electronic lock during the testing stage mode and to permanently prohibit the unlocking of said first electronic lock after the completion of the testing stage mode.

12. An integrated circuit according to claim 1, wherein said certain functions includes at least a first function and a second function; said first electronic lock being associated with said first function; and said second electronic lock being associated with said second function; wherein said first electronic lock is constituted by a set of first and second electrically erasable and programmable memory cells, a first command circuit for applying a locking signal to at least one of said first and second cells to cause said first and second cells to have states which differ from each other, and a second command circuit for applying an unlocking signal to one of said first and second cells to cause said first and second cells to have the same states; and wherein said second electronic lock is constituted by a set of third and fourth electrically erasable and programmable memory cells, a third command circuit for applying a locking signal to at least one of said third and fourth cells to cause said third and fourth cells to have states which differ from each other, a fourth command circuit for applying an unlocking signal to one of said third and fourth cells to cause said third and fourth cells to have the same states.

13. An integrated circuit according to claim 12 wherein said second command circuit comprises an AND circuit, the output of said AND circuit being connected to said second cell, a first input of said AND circuit being connected to receive an unlocking signal for said second command circuit, a second input of said AND circuit being connected to receive a signal indicating a testing stage mode.

14. An integrated circuit according to claim 13 wherein said second input of said AND circuit is connected to a one-shot latch circuit which can change to its on state at the first occasion when it is turned on and then changes to a permanent off state when the current thereto is first turned off, to thereby permit the unlocking of said first electronic lock during the testing stage mode and to permanently prohibit the unlocking of said first electronic lock after the completion of the testing stage mode.

15. A method for the testing of an integrated circuit having different electronic functions, among them at least one function that can be modified irreversibly by an activation of an electronic lock, comprising the following successive operations:

a general test is carried out on the integrated circuit while a first electronic lock is in an initial unlocked state;

the first lock is locked, and the functions modified by this locking are tested;

a second lock is locked, and the functions modified by this second locking are tested;

the first lock is unlocked;

the second lock is unlocked, this unlocking being made possible by the fact that the first lock is unlocked;

the first lock is locked irreversibly and, subsequently to this locking, any future unlocking of the second lock, after it has been activated, is barred.

16. A method for the testing of an integrated circuit having first and second electronic locks and having different electronic functions, among them at least one function that can be modified irreversibly by an irreversible activation of said first electronic lock and at least one function that can be modified irreversibly by an irreversible activation of said second electronic lock, said method comprising the following operations:

carrying out a general test on the integrated circuit while said first electronic lock is in an unlocked state;

locking said first electronic lock and testing the functions of said integrated circuit which are modified by said first electronic lock being in the locked condition;

locking said second electronic lock while said first electronic lock is in the locked condition, and testing, while said first and second electronic locks are in the locked condition, at least one of the functions of said integrated circuit which are modified by said second electronic lock being in the locked condition;

unlocking said first electronic lock after the testing of said at least one of the functions of said integrated circuit which are modified by said second electronic lock being in the locked condition;

unlocking said second electronic lock after said first electronic lock is unlocked after the testing of said at least one of the functions of said integrated circuit which are modified by said second electronic lock being in the locked condition, this unlocking being made possible by the fact that the first electronic lock is in the unlocked condition;

irreversibly locking said first electronic lock after (a) the completion of the testing of the functions which are modified by said second electronic lock being in the locked condition and (b) the subsequent unlocking of said second electronic lock, the irreversibly locking of the first electronic lock occurring while said second electronic lock is in the unlocked condition; and upon this irreversible locking of said first electronic lock, barring any future unlocking of said second electronic lock.

17. A method according to claim 16, further comprising inhibiting the unlocking of said second electronic lock whenever said first electronic lock is in the locked condition.

18. A method according to claim 16, wherein said first electronic lock is constituted by a set of first and second electrically erasable and programmable memory cells, wherein said first electronic lock is locked by applying a locking signal to at least one of said first and second cells to cause said first and second cells to have states which differ from each other, and wherein said first electronic lock is unlocked by applying an unlocking signal to at least one of said first and second cells to cause said first and second cells to have the same states.

19. A method according to claim 18, wherein said second electronic lock is constituted by a set of third and fourth electrically erasable and programmable memory cells, wherein said second electronic lock is locked by applying a locking signal to at least one of said third and fourth cells to cause said third and fourth cells to have states which differ from each other, and wherein said second electronic lock is unlocked by applying an unlocking signal to at least one of said third and fourth cells to cause said third and fourth cells to have the same states.

20. A method according to claim 19, wherein the locking signal for locking said first electronic lock erases one of said first and second cells and programs the other of said first and second cells, and wherein the unlocking signal for unlocking said first electronic lock erases the one of said first and second cells which is programmed.

21. A method according to claim 20, wherein the locking signal for locking said second electronic lock erases one of said third and fourth cells and programs the other of said third and fourth cells, and wherein the unlocking signal for unlocking said second electronic lock erases the one of said third and fourth cells which is programmed.

* * * * *